United States Patent [19]

Escobedo

[11] Patent Number: 5,496,049
[45] Date of Patent: Mar. 5, 1996

[54] VARIABLE DRIVE MECHANISM FOR CYCLE TYPE VEHICLES

[76] Inventor: Francisco Escobedo, 23305 Ladeene Ave., Torrance, Calif. 90505

[21] Appl. No.: 230,255

[22] Filed: Apr. 20, 1994

[51] Int. Cl.⁶ .............................. B62M 11/04; F16H 1/12; F16H 3/08
[52] U.S. Cl. .............................. 280/238; 74/351; 280/260
[58] Field of Search ..................... 280/236, 237, 280/238, 260; 74/347, 366, 351

[56] References Cited

U.S. PATENT DOCUMENTS

| 707,359 | 8/1902 | Scharbach | 280/238 |
|---|---|---|---|
| 3,863,503 | 2/1975 | Loeb et al. | 74/347 |
| 3,934,481 | 1/1976 | Foster | 280/238 |
| 4,447,068 | 5/1984 | Brooks | 280/260 |
| 4,813,302 | 3/1989 | Davidow | 280/238 |
| 5,251,504 | 10/1993 | Summerville et al. | 74/366 |

FOREIGN PATENT DOCUMENTS

| 2263953 | 8/1993 | United Kingdom | 74/351 |
|---|---|---|---|

*Primary Examiner*—Mitchell J. Hill
*Attorney, Agent, or Firm*—Roger A. Marrs

[57] ABSTRACT

A drive mechanism for a cycle vehicle is disclosed herein for selectively importing a driving force from a pedal operated front gear drive section to a rear gear driven section via a variable transmission. The drive section and the driven section include a plurality of concentric circular rows of gear teeth selectively engageable by front and rear intermediate gears positionable on linear guide rods by a variable combination of manually settable transmission gears. The drive and driven section gears constitute shift gears adapted to achieve gear speed change and provide a driving force to the rear wheel via rotating shafts.

8 Claims, 3 Drawing Sheets

U.S. Patent Mar. 5, 1996 Sheet 1 of 3 5,496,049
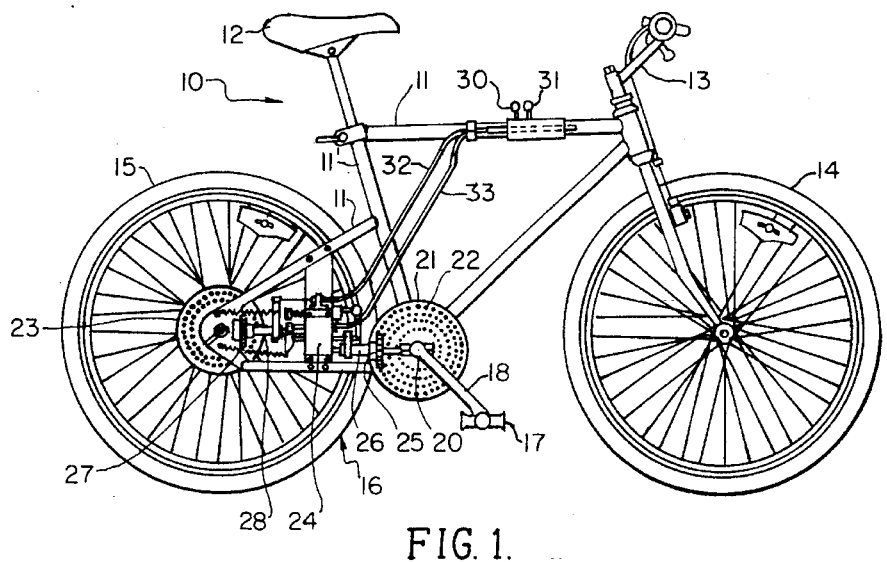
FIG. 1.
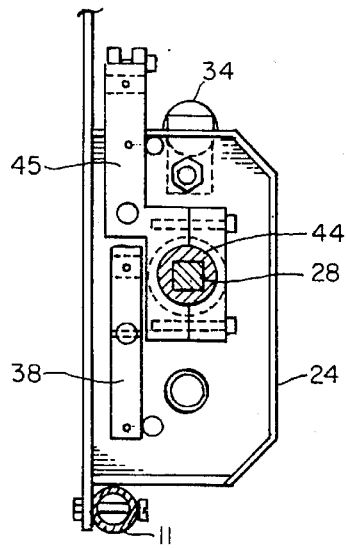
FIG. 4.
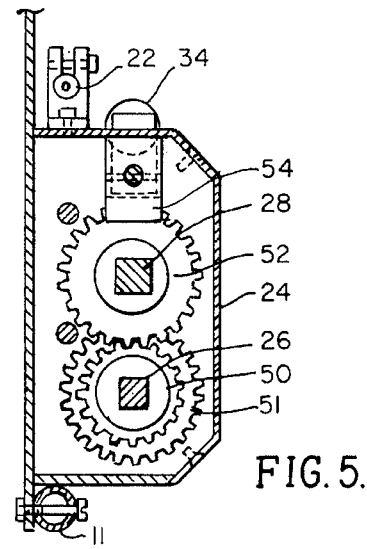
FIG. 5.
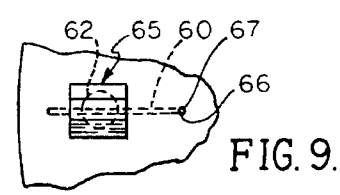
FIG. 9.
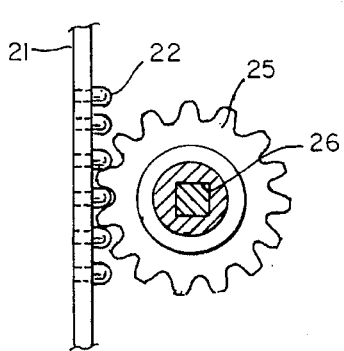
FIG. 6.
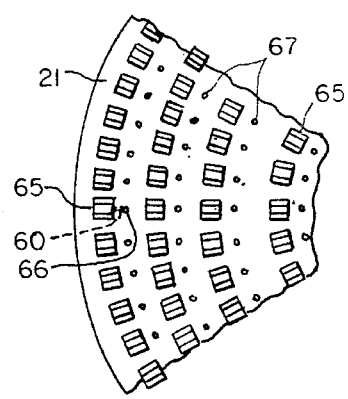
FIG. 7.
FIG. 8.

5,496,049

VARIABLE DRIVE MECHANISM FOR CYCLE TYPE VEHICLES

BACKGROUND OF THE INVENTION

1. Field of the Invention

The present invention relates to the field of mechanical drives for vehicles, and more particularly to a novel variable drive mechanism for powering the drive wheel of a cyclic type vehicle employing a novel means utilizing a gear speed change and drive shaft to power the rear wheel of the vehicle.

2. Brief Description of the Prior Art

In the past, it has been the conventional practice to employ a sprocket and chain drive for powering the rear wheel of a vehicle, such as a bicycle or the like. Such a chain and sprocket drive generally includes a derailleur system for permitting the driver to selectively engage a variety of sprocket gears with the chain in order to derive a variety of power combinations. Such a system generally includes a manual shifting means which is connected to the derailleur mechanism so that the chain is physically lifted from one driven sprocket wheel to another sprocket gear. The selection of sprocket gears and, therefore, speed and power is determined by the selection of sprocket gears powering the drive shaft of the rear wheel. Limited selection of gear or gear ratios is permitted by the drive gear which is generally under pedal control by the user. Furthermore, conventional sprocket and chain drive is subject to chain breakage and in many instances, the chain will "jump" off of the teeth of the drive or driven sprocket gear. The number of drive speeds is limited in a derailleur type system and shifting of gears from one speed to another requires movement of the vehicle so that no gear changes are permitted while the vehicle is stationary.

In other instances, it is difficult to remove the rear wheel for tire changes, repairs or the like since the derailleur mechanism is very complex and generally requires skill for reassembly.

Therefore, a long-standing need has existed to provide a variable drive mechanism for cycle-type vehicles which eliminates the necessity for a chain and sprocket drive system. Such a novel solution may incorporate a gear speed change and drive shaft connecting the drive mechanism to the rear driven wheel whereby a multiplicity of gear speeds may be selected by the driver in a convenient manner. Such a gear selection system includes utilizing the drive gear as well as the driven gear for speed control as well as an intermediate transmission connecting the drive and driven gears together.

SUMMARY OF THE INVENTION

Accordingly, the above problems and difficulties are avoided by the present invention which provides a novel vehicle incorporating a variable drive mechanism which includes a front gear section connected to a rear gear section via a variable transmission and rotating rods. The gear sections may take the form of plates having gear teeth laterally projecting from the surface of the plates and arranged in circular rows in a concentric pattern on each plate. The transmission includes drive gears and driven gears interconnected by intermediate gears and are in turn connected to the front gear section drive plate and the rear gear section driven plate by rotating shafts. A selection means is provided incorporating manually manipulated handles connected to the shaft means so that a variety of gear ratios and cycle speeds can be attained by positioning take-off gears carried on the shaft means with respect to selected rows of drive plate teeth. Other manual means are provided for selecting gear ratios within the transmission which again varies the selection of gear ratios and speed attainment.

Therefore, it is among the primary objects of the present invention to provide a variable drive mechanism for vehicles which eliminates sprocket and chain drives and further eliminates the need for derailleur systems.

Another object of the present invention is to provide a variable drive mechanism having a drive gear and a driven gear interconnected by rotating rods via a variable transmission so that a variety of vehicle speeds and gear ratios may be manually selected by the user.

Another object of the present invention is to provide a novel variable drive mechanism which may be shifted between a multiplicity of gear speeds and ratios while the vehicle is stationary or moving.

Yet another object of the present invention is to provide a novel variable mechanism interconnecting a drive means with a driven means that incorporates an interconnecting rotatable shaft means and which further incorporates lateral positioned gear teeth on the side of a drive and a driven plate adapted to be selectively engaged by take-off gears associated with the rotating plates.

A further object resides in providing a novel drive means by which the rear wheel of a cycle-type vehicle can be removed for service or repairs by simply undoing the two axle nuts and sliding the wheel from the frame.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a side elevational view of a bi-wheel vehicle incorporating the variable drive mechanism incorporating the present invention;

FIG. 4 is a transverse cross-sectional view of the variable drive mechanism shown in FIG. 2 as taken in the direction of arrows 4—4 illustrating the rear rotating means;

FIG. 5 is a transverse cross-sectional view of the variable drive mechanism taken in the direction of arrows 5—5 of FIG. 2 illustrating the transmission;

FIG. 6 is a transverse cross-sectional view of the front rotating means taken in the direction of arrows 6—6 of FIG. 2;

FIG. 7 is a fragmentary elevational view illustrating another version of gear teeth carried on the drive and driven plates;

FIG. 8 is an enlarged perspective view of a novel tooth as carried on the plates shown in FIG. 7; and FIG. 9 is a view similar to the view of FIG. 7 showing the self locating capability of the plate teeth.

DESCRIPTION OF THE PREFERRED EMBODIMENT

Figure 2:
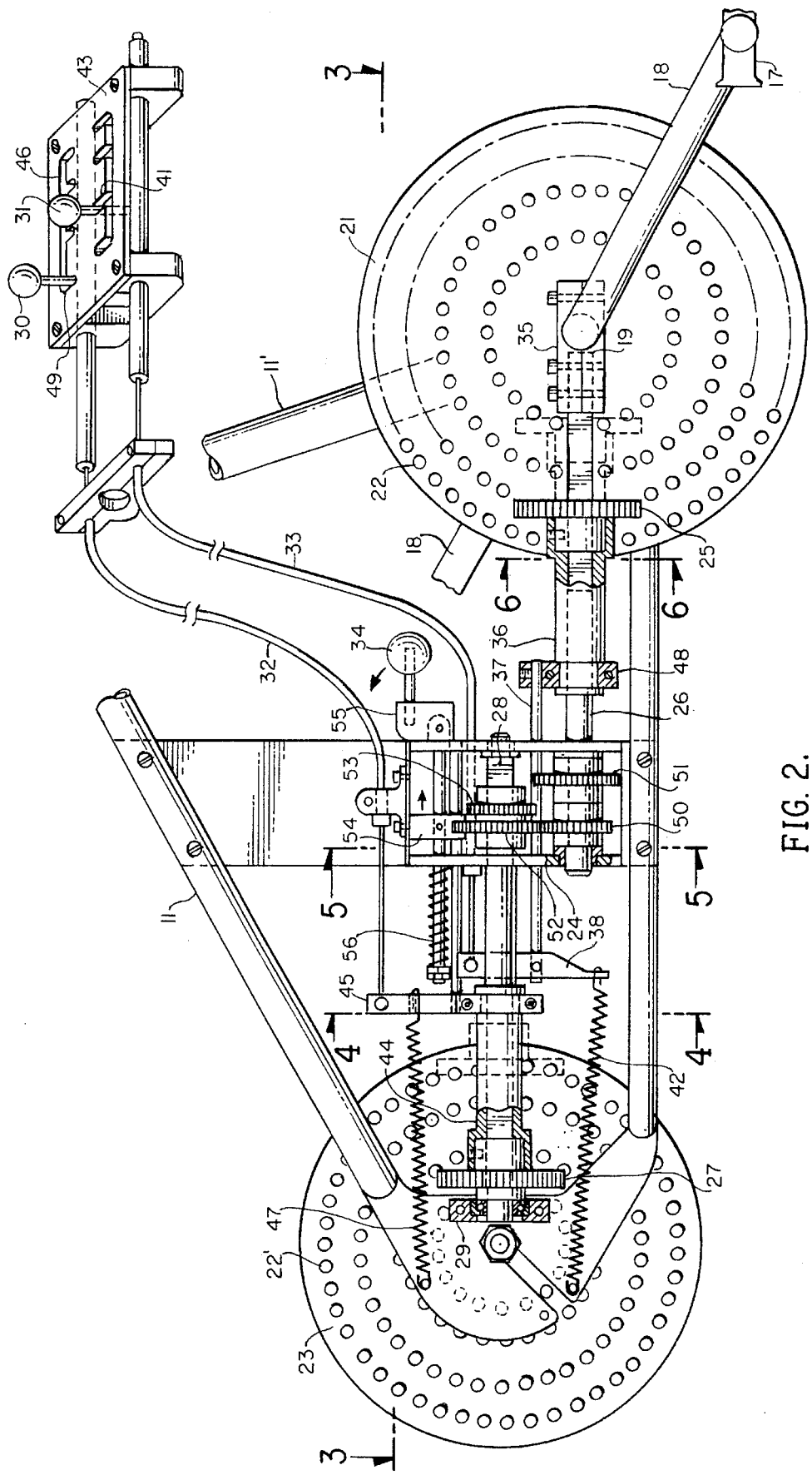
FIG. 2 is a greatly enlarged side elevational view of the variable drive mechanism used on the cycle vehicle shown in FIG. 1.

Referring to FIG. 1, a bicycle is illustrated in the general direction of arrow 10 which is intended to be representative of a cycle-type vehicle. The vehicle includes a frame 11 supporting a user's seat 12 and handle bars 13 operably connected to a front steering wheel 14 and a rear drive wheel 15. The variable drive mechanism for driving the rear wheel 15 is indicated in the general direction of arrow 16 and is operated by the driving of foot pedals 17 and pedal cranks 18 located on opposite sides of a rotating shaft mounted on a bushing 20.

The drive mechanism of the present invention includes a front gear section that includes a circular drive plate 21 having a plurality of teeth laterally extending outwardly from the side of plate 21 and a single tooth is indicated by numeral 22. A rear gear section includes a driven plate 23 which also incorporates a plurality of laterally facing and projecting teeth. The rear driven plate is connected to the rear axle supporting the wheel 15 so that as the driven plate 23 rotates, the wheel will follow the rotation. Interconnecting the drive plate 21 and the driven plate 23 is a gear box transmission indicated by numeral 24. An interconnecting drive means further includes a front shift gear 25 coupled to the gear box 24 via a square shaft 26 while the driven plate 23 is coupled to the gear box 24 via a rear shift gear 27 and a square rotating shaft 28. Both shafts 26 and 28 are square in cross-section.

Therefore, as the drive plate 21 is rotated, the rotational drive is introduced to the gear box 24 via the front shift gear 25 and rod 26. The speed or gear ratio is determined by alignment of the shift gear 25 with a respective row of teeth 22 on the drive plate 21. The output from the gear box 24 is transferred to the driven plate 23 and consequently, wheel 15, by the shaft or rod 28 and shift gear 27. The shift gear 27 is placed into selective alignment with a particular row of teeth on the side of plate 23. Controls for determining the position of the shift gears 25 and 27 are determined by manual hand controls 30 and 31 via sheathed cables 32 and 33 respectively. The portion of the gears within the transmission gear box 24 is under the control a a manual two-position lever identified by numeral 34.

Referring now to FIG. 2, the variable drive mechanism 16 is more clearly illustrated. The front gear section includes a drive plate 21 having a plurality of teeth 22 arranged in circular rows in concentric relationship and coaxially disposed with respect to the central axis of the plate 21. The teeth 22 outwardly project laterally from the side of the plate =21 and are fully exposed for selective engagement by a front shift gear 25. The plate 21 is rotated by means of the pedals 17 via pedal crank 18 and 18' which are fixed to the plate. The shaft 26 is of square cross-section and is rotatable with the front shift gear 25 in response to rotation by plate 21. The one end of shaft 26 is mounted in a bearing block 19 while the opposite end of the shaft 26 is rotatably mounted on the gear box 24. As shown in solid lines, front shift gear 25 is aligned with the second row of teeth counted from the outside diameter or edge and as illustrated in broken lines, the shift gear 25 is placed in alignment with the innermost circular row of teeth. The means for positioning the shift gear will be described later. Shaft 26 may be referred to as an input shaft to the gear box 24 and an output shaft 28 of square cross-section is rotatably carried at one end on the gear box while its opposite end is rotatably carried in a bearing block 29. A rear shift gear 27 is slidably carried on the shaft 28 and is positionable across the face of driven plate 23 so as to be in alignment with a selected one of several circular rows of teeth, such as tooth 22' which outwardly projects laterally from the side of the plate. In the present illustration, four rows of circular teeth are shown in connection with plate 21 and four circular rows of teeth are illustrated in connection with plate 23. As illustrated in solid lines, rear shift gear 27 is in a drive position wherein it is engaged with the inner or fourth row. However, as shown in its broken line position, the shift gear 27 is in alignment with the outermost or first row of teeth so that a different driving relationship is produced wherein rotation of the output shaft 28 turns the shift gear 27 which drives the gear 23. Plate 23 is fixedly attached to the rear axle so that wheel 15 is driven in unison with the rotation of driven gear 23.

FIG. 2 further illustrates the controls for moving the shift gears across the face of the respective plates 21 and 23. Control knobs 30 and 31 are attached to sheathed cables 32 and 33 so that as the control knobs 30 and 31 are moved through elongated slots in plate 43, the cables will move the shift gears on their respective square shafts 26 and 28. It can be seen that the plate 43 includes a pair of elongated slots, such as slot 46, in which the control lever knobs 30 and 31 can be individually moved. Each of the elongated slots also includes lateral slots which conform to the number of rows of teeth in the respective plates. For example, shift control knob 30 includes four lateral slots which conform to the four rows of teeth on the side of plate 23 while the slots, such as 41 associated with control 31, set the shift gear in relationship to its associated circular row of teeth on plate 21.

In order to move the front shift gear 25 on shaft 26, it can be seen that the mount 36 for the gear onto the shaft includes an element 48 which is secured to one end of an arm 37 extending into fixed attachment with a control element 38. One end of the cable 33 is attached to the control element 38 which causes the element to move forwards and backwards along a portion of the length of shaft 28. The movement of element 38 translates into rectilinear movement of the shift gear 25 via the rigid arm 37 and the connecting element 48. A spring 42 connected at one end to the control element 38 and at its other end to the frame 11 places a bias on the shift gear 25 normally pulling the gear rearward on shaft 26 so that it is in a selected position such as neutral or simply engaged with the outermost or first row of circular teeth.

With respect to the rear shift gear 27, this gear is moved rectilinearly on shaft 28 by means of manual control 30 where one end of sheathed cable 32 is attached to a control element 45 which is secured to the mount of rear shift gear 27. Therefore, as control element 45 is moved by cable 32, the shift gear 27 will follow this movement along shaft 28. Therefore, it can be seen that the positioning of the control knob 30 will place the rear shift gear 27 in alignment and driving relationship with a selected one of the circular rows of teeth on the driven plate 23. Spring 47 connected between the frame 11 and the control element 45 places a yieldable bias on the gear 27 causing it to be in its engaged position or, if desired, in alignment with the fourth or innermost circular row of teeth 22'. A slider 44 fixedly secures the gear 27 with the control element 45 and moves along the square shaft 28 in unison with the gear 27. Mounted between the gear box 24 and the fixture 35 carried on the pedal crank axle, there is provided a fixed square, in cross-section, shaft 26 on which a sliding mount 36 moves in a linear manner. The mount 36 carries the shift gear 25 thereon so that the teeth of the gear may be selectively aligned with a selective row of teeth carried on the plate 21. The mount 36 is moved by means of an arm 37 attached to an element 38 which moves back and forth in accordance with the positioning of handle 31 via cable 33. One end of the cable is attached to the element 38 while the other end of the cable is attached to knob 31 and it can be seem that the positioning of this control within a slot 41 will set the positioning of the front shift gear 25 in a selected one of its positions. In solid lines, the shift gear 25 is in alignment with the circle of teeth representing the second row from the outside of teeth. In broken lines, the front shift gear 25 is illustrated in alignment and, therefore, in mesh with the fourth row of teeth counted from the outside. It is noted that expansion spring 42 is in tension so that a bias is placed on element 38 drawing the element endward towards the rear of the bicycle frame into a position where the shift gear 25 will be in alignment with any of the rows of teeth. By manipulating the hand control knob 31 within the slot 41, the expansion tension of the spring 42 is overcome and the spring expanded to permit yieldable movement of the shift gear towards the rows of teeth. The various slots in the slot control 41 relate to set positions of the shift gear 25 with respect to a selective row of teeth. For example, four lateral slots are shown in the plate 43 and each one of the lateral slots corresponds to an aligned position of the gear 25 with one of the four circular rows of teeth. With respect to the rear shift gear 27, the gear is positionable across the four rows of teeth in response to movement of its sliding mount 44 on the square rod 28. Element 45 is carried on the mount 44 and the end of cable 32 is attached to the element so that as the control knob 30 is positioned within slot 46, the shift gear 27 will be placed in alignment with a selective circular row of teeth. A spring 47 attached between the frame and element 45 biases the shift gear 27 to its rearmost position. As shown in broken lines, the shift gear 27 is advanced by manipulation of the control knob 30 within the slot 49 to where the shift gear is in position with the outermost circular row of teeth. Lateral slots, such as slot 48, are connected to the main slot 46 as explained earlier with respect to slot 41 so that the control can be introduced into a lateral slot to hold the shift gear in position with its selected circular row of teeth.

A further variable adjustment for speed is in the provision of the gear box 24 which includes a first gear set having gears 50 and 51 of different diameters adapted to rotate together in unison and further including intermediate gears 52 and 53 which are adapted to rotate about square rod 28. It can be seen that the gears 52 and 53 may be adapted to mesh with either gears 50 or 51 by movement of a slider 54 in accordance with movement of a two-position control knob 34. As illustrated in solid lines, the position of the control knob 34 places the key or slider 54 such that gear 52 engages with gear 50. However, if the control knob 34 is lifted as shown in the direction of the adjacent arrow, a cam surface 55 rotates about its pivot connection to the case of the gear box 24 so that the key or slider 54 is moved to the right, as illustrated in solid lines so that the gear 53 meshes with the gear 51. The action is similar to an over center toggle mechanism wherein a spring 56 will hold the latch control 34 in either one of its two positions with respect to the gears 52 and 53 being alternately in mesh with gears 50 and 51.

Figure 3:
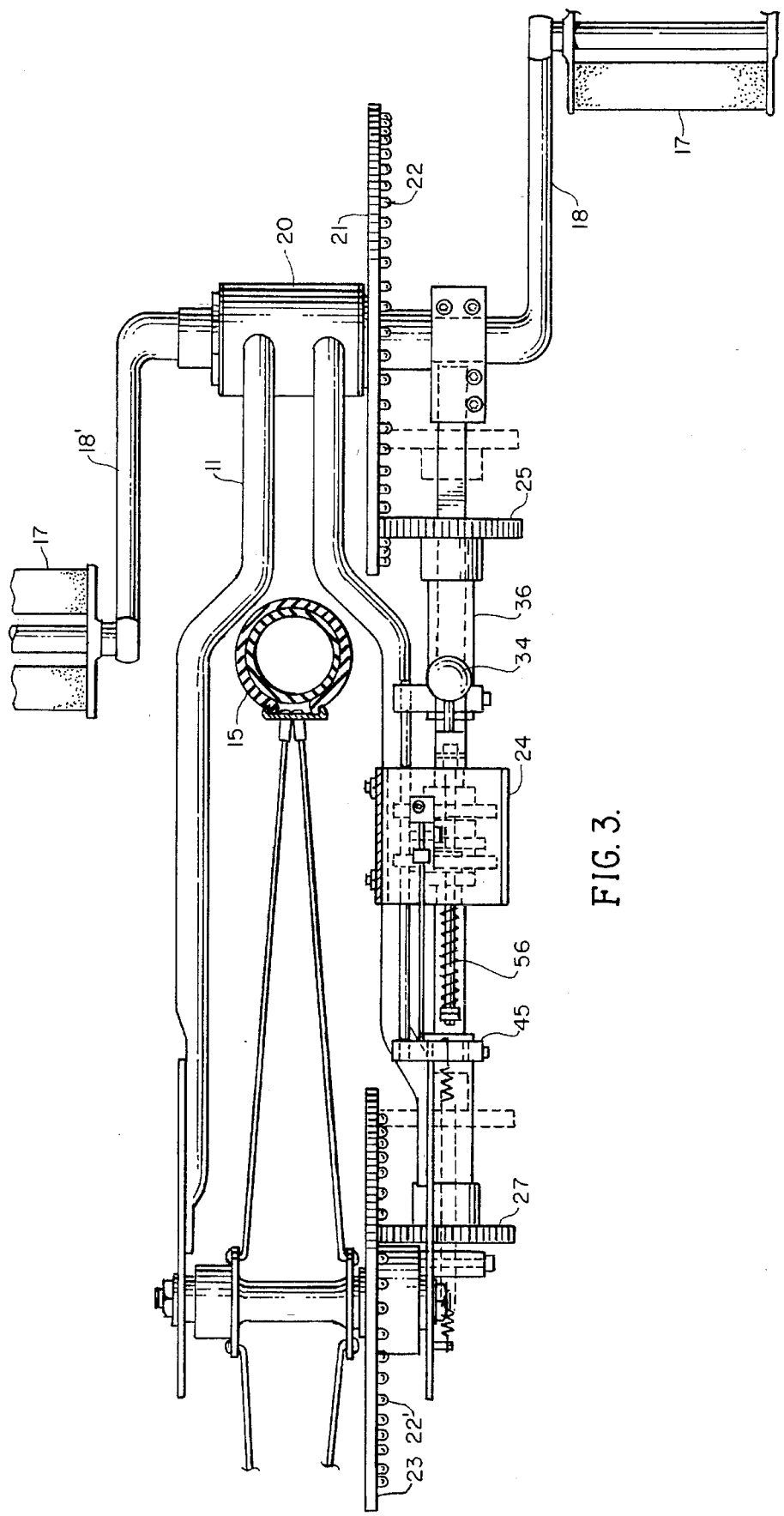
FIG. 3 is a cross-sectional view of the variable drive mechanism shown in FIG. 2 as taken in the direction of arrows 3—3 thereof.

Referring now in detail to FIG. 3, it can be seen that the front gear 25 is in mesh with teeth on the side of plate 21 and, as illustrated in broken lines, the shift gear has been moved so as to be in mesh with another row. Also, the solid line showing or rear shift gear 27 shows the shift gear in alignment with teeth of one row while in a broken line position, rear shift gear 27 is in alignment with teeth on the outer row.

Referring now to FIGS. 4 and 5, details of the element mounting and position are illustrated as well as the transmission gear box 24. Also, it can be seen that the shafts 26 and 28 are of square cross-section and are arranged in parallel spaced-apart relationship. These shafts rotate in accordance with rotational movement of the various gears and also serve as guides to support the rectilinear movement of the front and-rear shift gears respectively as well as the intermediate transmission gears 52 and 53.

Referring now in detail the FIG. 6, it can be seen that the shift gear 25 is in alignment with a row of round, fixed teeth 22 carried on the side of plate 21. Therefore, as plate 21 is rotated, the rotational movement is applied to the shift gear 25. In FIGS. 7 and 8, an alternate method with prepositioned teeth can be seen wherein the teeth are arranged in circular rows on the side of the plate and that the individual teeth, such as tooth 65, includes a spring anchor or retaining mounting pin 60 having an anchor 67 that retains each tooth in a loose position. By permitting slight flexible movement of each of the respective individual teeth, pre-alignment of the gear teeth therewith is more positive and more force is applied over mating surface of the interlocking teeth. Anchor 67 is received into opening 66.

In FIGS. 8 and 9, it can be seen that the tooth 65, as an example, includes a wedge-shaped head 61 carried on the end of a shank 62 and that the retaining or anchor pin 60 passes through the shank on the opposite side of the plate from the head 61. Preferably, the edges exposed on the head 61 are rounded, such as indicated by numeral 63, so that more positive interlock between the meshed teeth of the gears is attainable.

Note is taken in FIG. 7 that the individual teeth are not arranged on a radial center line starting from the inside of the plate and extending to its outer edge. Therefore, the center line of each respective tooth may be different with respect to adjacent teeth and that the pre-position of the teeth may be such that one is driving and one is driven.

In view of the foregoing, it can be seen that a variety of gear ratios and vehicle speeds may be obtained through the three manual controls deployable by the user. A variety of speeds can be obtained by positioning the front shift gear with respect to the teeth on the driving plate 21 and to this adjustment can be added the arrangement of gear ratios with respect to the rear shift gear respective to the rows of teeth carried on the rear plate 23. Additional adjustment is achieved through the gear box 24 so that the user may be precise in attaining the exact speed and force necessary for driving the vehicle.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A variable drive mechanism for a cycle-type vehicle comprising:

a driving gear;

a driven gear;

gear means interconnecting said driving gear with said driven gear;

said gear means includes a pair of shift gears selectively coupled with said driving gear and said driven gear respectively;

manual control means operatively and selectively connected between said pair of shift gears for independently moving each of said shift gears in said pair into and out of mesh with said driving and said driven gear respectively;

a vehicle frame rotatably mounting said driving gear and said driven gear in spaced-apart relationship;

each of said driving gear and driven gear being a flat plate having a plurality of gear teeth carried thereon outwardly projecting laterally so as to be selectively engageable with said gear means;

said driving gear having a flexible mounting for each of said gear teeth carried thereon;

said plurality of gear teeth are arranged in concentric spaced-apart rows;

said gear means further having transmission gears interconnecting said pair of shift gears;

transmission control means separate from said control means for said shift gears operable increase and decrease the speed of said driven gear; and spring-biasing means connected between said shift gears cooperating with said manual control means to releasably retain said shift gears in engaging relationship with a selected row of teeth on said driving gear and said driven gear respectively.

2. The invention as defined in claim 1 wherein:

said manual control means includes a separate and individual control lever and cable means for separately actuating each of said shift gears.

3. The invention as defined in claim 2 including:

spring means operatively including said transmission control means biasing said transmission control in a selected one of two alternate positions.

4. In variable drive apparatus for a cycle-type vehicle having front and rear wheels rotatably carried on a frame and manually actuated by foot pedals, the combination comprising:

a circular drive plate secured to said pedals for rotation therewith in response to manual rotation;

a circular driven plate rotatably coupled to said rear wheel for rotation therewith;

said drive plate and said driven plate having a plurality of circular concentric rows of spaced-apart gear teeth outwardly projecting laterally wherein each row is of a different diameter with respect to the center of each plate;

revolving shaft means carried on said frame having opposite end terminating adjacent to said drive plate and said driven plate respectively;

shift gear means slidably carried on said revolving shaft means including a front shift gear and a rear shift gear responsive to selectively engaging a selected row of teeth of said plurality on said drive gear and said driven gear respectively;

said drive plate and said driven plate rotate about spaced-apart horizontal axis consisting of a front axle and a rear axle respectively;

expansion spring means operatively coupled between said frame and each of said shift gears to normally bias said shift gears into retaining relationship with their associated selected row of gear teeth.

said revolving shaft has opposite ends;

bearing blocks carried on said axles receiving said revolving shaft ends;

said revolving shaft having a square transverse cross-section slidably mounting said shift gears for linear movement;

manually operated hand controls mounted on said frame and coupled to each of said shift gears respectively for positioning said shift gears along said revolving shaft into and out of alignment with said plurality of rows of gear teeth;

transmission gears slidably carried on said revolving shaft between said shift gears operable to change rotational speed of said shift gears;

control means carried on said frame for separately positioning said shift gears and said transmission gears;

said revolving shaft comprises a front section slidably mounting said front shift gear and a rear section slidably mounting said rear shift gear;

said front section and said rear section overlapping in spaced-apart relationship permitting linear sliding movement of said transmission gears into and out of engagement;

said plurality of gear teeth include individual self-locating and pre-positional teeth adjusting to mesh with said shift gears; and each of said gear teeth is yieldably spring-biased to self-locate with respect to said shift gears.

5. In a self-adjusting gear teeth assemblage for a pair of driven and driving gears, the improvement which comprises:

a pair of driven and driving gears;

a plurality of gear teeth carried on a selected one of said driven and driving gears;

a flexible mounting for each booth of said plurality on said selected one gear of said driven and driving gears permitting limited flexible movement so as to fully achieve meshing between gear teeth of said pair of driven and driving gears;

each tooth of said plurality of gear teeth adapted to rotate about an axis normal to said selected one gear of said driven and driving gears; and said flexible mounting for each tooth includes a spring secured between each tooth and said selected gear normally biasing each tooth into a neutral position.

6. The invention as defined in claim 5 wherein:

said flexible mounting allows pre-positioning of each tooth with respect to said non-selected gear.

7. The invention as defined in claim 6 wherein:

said selected gear is a flat plate having a flat face from which said plurality of teeth outwardly project;

said plurality of adjacent teeth arranged in concentric circular rows with each tooth lying in a row in a different radial axis than adjacent teeth.

8. The invention as defined in claim 7 wherein:

each tooth includes a rounded head supported on a shaft;

said spring carried on said shaft and said spring having an anchor pin secured to said plate.

* * * * *